(12) United States Patent
Cote et al.

(10) Patent No.: US 6,199,021 B1
(45) Date of Patent: Mar. 6, 2001

(54) METHOD AND APPARATUS FOR MEASURING POWER OUTPUT OF ONE POWERING A CHAIN DRIVEN VEHICLE

(75) Inventors: Alan Cote, East Aurora, NY (US); Jean-Joseph Cote, Boulder, CO (US); John C. Croy, Middleton, RI (US)

(73) Assignee: CC Kinetics, Inc., East Aurora, NY (US)

(*) Notice: Subject to any disclaimer, the term of this patent is extended or adjusted under 35 U.S.C. 154(b) by 0 days.

(21) Appl. No.: 09/083,374

(22) Filed: May 22, 1998

Related U.S. Application Data

(60) Provisional application No. 60/062,355, filed on Oct. 15, 1997.

(51) Int. Cl.[7] ................. G01L 1/00; G01L 3/00
(52) U.S. Cl. .............. 702/44; 73/54.41; 73/570; 73/862.321; 73/862.322; 73/862.381; 73/862.391; 73/862.41
(58) Field of Search ............ 702/44; 73/862.08, 73/862.28, 862.321, 862.322, 862.324, 54.28, 54.31, 54.41, 570, 868.451, 862.194, 862.195, 862.391, 862.41, 862.42

(56) References Cited

U.S. PATENT DOCUMENTS

| | | | |
|---|---|---|---|
| 1,107,234 | 8/1914 | Morscher | 73/862.194 |
| 2,618,970 | 11/1952 | Hitchcock et al. | 73/862.41 |
| 4,071,892 | 1/1978 | Genzling | 701/200 |
| 4,141,245 | * 2/1979 | Branstetter | 73/144 |
| 4,434,801 | 3/1984 | Jiminez et al. | 600/502 |
| 5,027,303 | * 6/1991 | Witte | 702/44 |
| 5,167,159 | 12/1992 | Lucking | 73/862.451 |
| 5,426,968 | 6/1995 | Mertens | 73/862.474 |
| 5,545,982 | 8/1996 | Vlakancic | 324/174 |
| 5,585,560 | 12/1996 | Goossens | 73/494 |

* cited by examiner

*Primary Examiner*—Marc S. Hoff
*Assistant Examiner*—Hien Vo
(74) *Attorney, Agent, or Firm*—Hodgson Russ Andrews Woods & Goodyear LLP

(57) ABSTRACT

The invention broadly provides a method and apparatus for measuring the power output of one powering a chain driven vehicle. In a preferred embodiment described, the vehicle is a bicycle. The method of the invention comprises measuring the speed and tension of the drive chain and calculating the power output therefrom. The apparatus of the invention includes a chain speed sensor, a chain tension sensor, and electronic processing means to calculate and display the power output based upon the chain measurements.

33 Claims, 14 Drawing Sheets

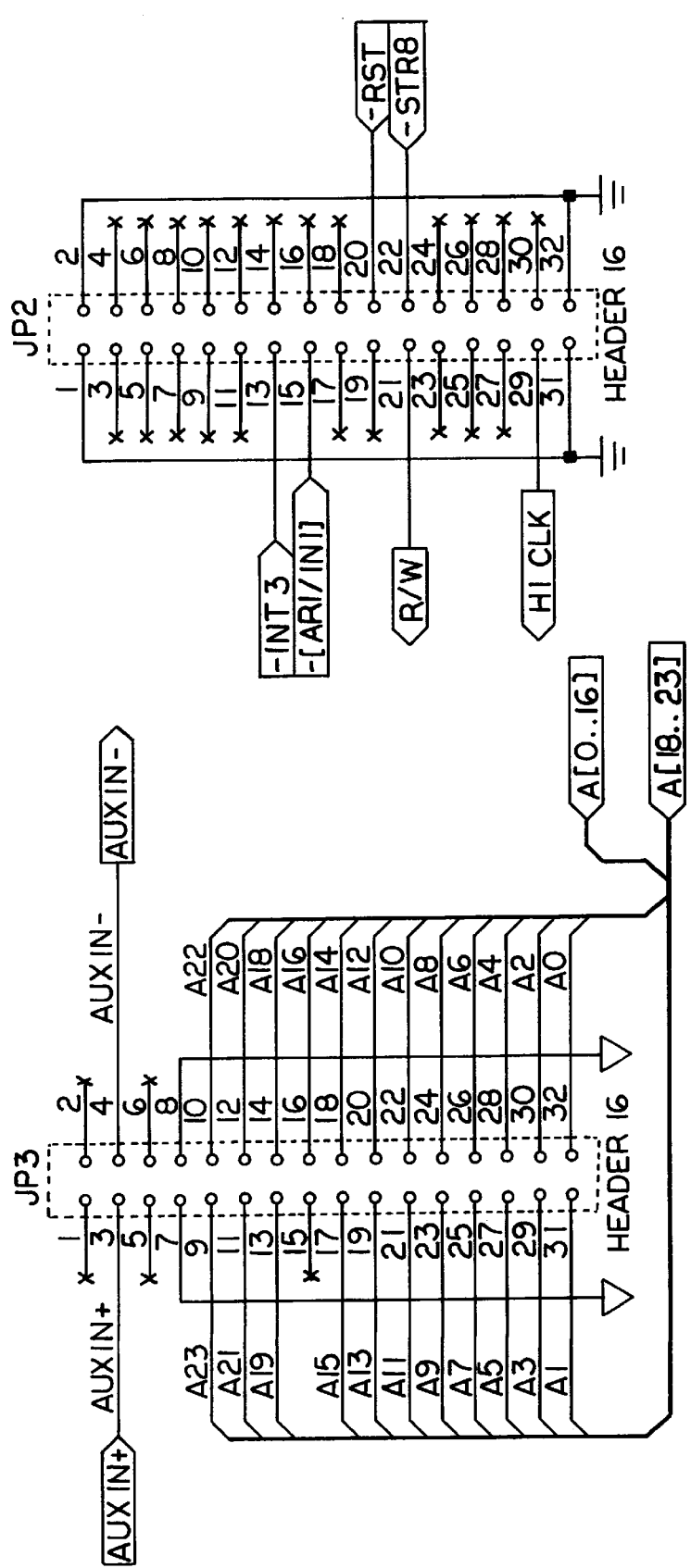

| FIG. 9A | FIG. 9B | FIG. 9C | ers
METHOD AND APPARATUS FOR MEASURING POWER OUTPUT OF ONE POWERING A CHAIN DRIVEN VEHICLE This application claims the benefit of Provisional Application No. 60/062,355 filed Oct. 15, 1997.

FIELD OF THE INVENTION

This invention relates generally to a method and apparatus for measurement of power output of one powering a chain driven vehicle. More specifically, it relates to an apparatus and method for the measurement of power output of a bicyclist.

BACKGROUND OF THE INVENTION

It is often desirable to measure power output of a bicyclist or a rider of other human powered vehicle. Such information is useful both for the casual rider as well as the high performance trainer. A bicyclist can use this information, among other things, to monitor increases in cardiovascular fitness, quantify maximum output and power, optimize pedaling cadence, and determine maximum efficiency. Such measurements are also useful to those seeking to reduce body fat though exercise or to replenish food during extended rides. While power measuring devices are available on stationary exercise equipment commonly found in health clubs and the like, the size of currently available power measuring devices makes it impractical to install them on actual human powered vehicles.

In addition to human powered vehicles, power measurements would also be useful for motor driven devices. For example, in motor assisted bicycles, chain tension and/or human power output can be used to determine the relative instantaneous output of the motor. For motor-driven devices such as motorcycles, chain tension and power output can be used to monitor the load on the engine, which relates information on fuel consumption, mechanical wear, and efficiencies.

What is needed then, is a method and device which is compact in size and operatively arranged to measure power output of a bicyclist.

SUMMARY OF THE INVENTION

The invention broadly provides a method and apparatus for measuring the power output of one powering a chain driven vehicle. In a preferred embodiment described, the vehicle is a bicycle. The method of the invention comprises measuring the speed and tension of the drive chain and calculating the power output therefrom. The apparatus of the invention includes a chain speed sensor, a chain tension sensor, and electronic processing means to calculate and display the power output based upon the chain measurements.

The primary object of the invention is to provide a method and apparatus for measuring the power output of one powering a chain driven vehicle.

Another object of the invention is to display power output of a bicyclist in real time as the cyclist is riding.

These and other objects, advantages and features of the invention will become obvious to those having ordinary skill in the art upon a reading of the following detailed description, read in conjunction with the drawings.

DETAILED DESCRIPTION OF THE PREFERRED EMBODIMENT

Figure 1:
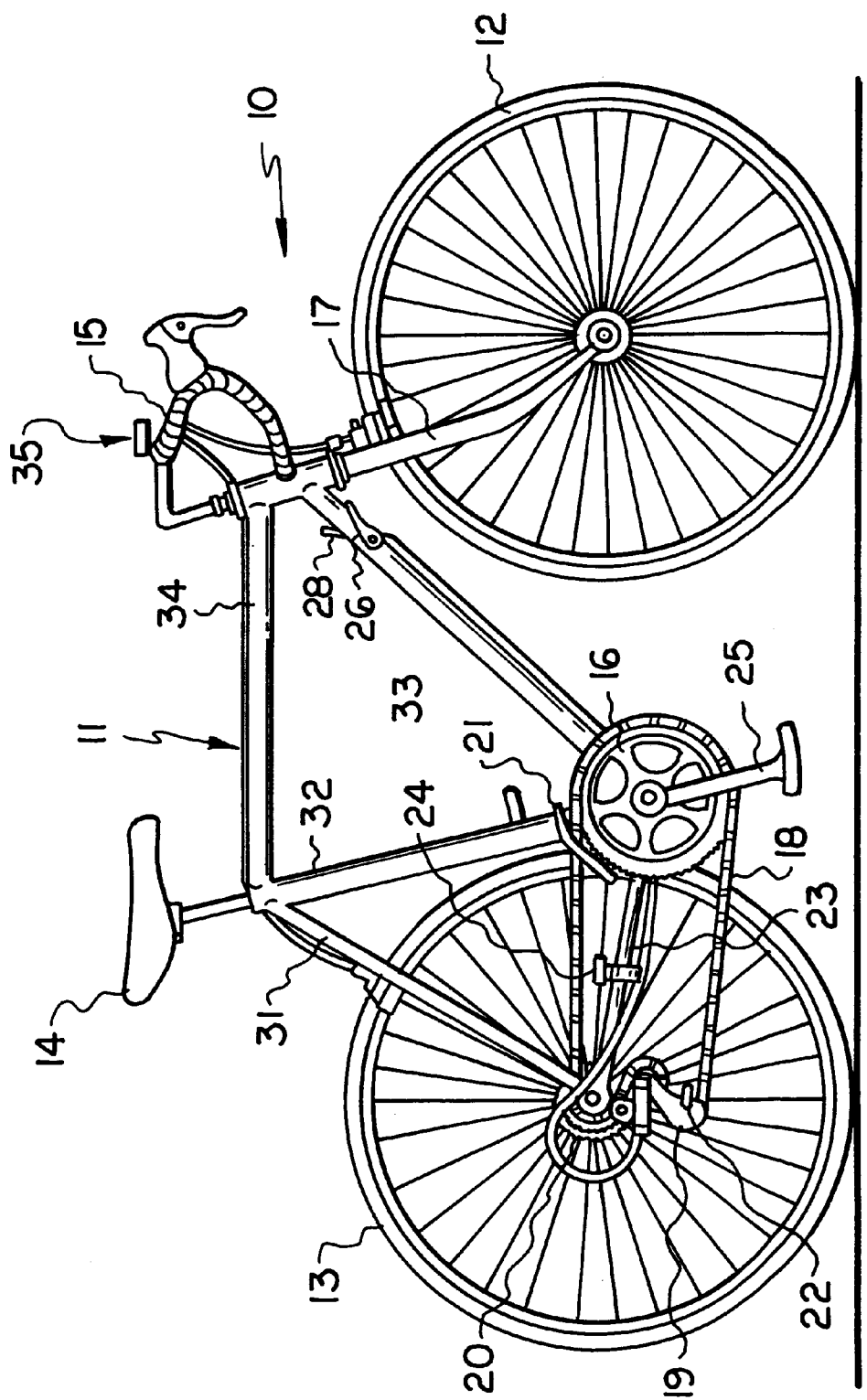
FIG. 1 is a side view of a typical multi-speed bicycle with which the present invention is used.

At the outset, it should be understood that the description which follows is directed to a preferred embodiment of the invention, but that the appended claims are not so limited. It should be also appreciated that like reference numerals on different drawing figures refer to identical structural elements.

FIG. 1 illustrates a typical multi-speed bicycle 10 which is well known in the art. The bicycle, which, in this embodiment is a 10-speed bicycle, comprises a frame 11, which frame comprises top tube 34, seat tube 32, seat stay 31, chain stay 23 and down tube 33. The bicycle further comprises front fork 17, front wheel 12, rear wheel 13, seat 14, handlebars 15, drive sprocket 16, pedal 25, chain 18, front derailleur 21, sprocket cluster 20, rear derailleur 19, front derailleur shift lever 28 and rear derailleur shift lever 26.

As is well known in the art, to propel the bicycle, the rider drives the pedal, turning the front sprocket and causing the chain to engage and drive one of the rear sprockets. The rear sprockets, in turn, are fixedly secured to the rear axle of the rear wheel, and thereby drive the wheel to cause the bicycle to move. The front derailleur is used to move the chain from one of a plurality of front drive sprockets. In a 10 speed bicycle as shown, there are typically two front sprockets, each with a different number of teeth (e.g., 22 teeth on the small sprocket and 54 teeth of the large sprocket). Similarly, the rear derailleur is used to move the chain from one rear sprocket to another. Typically, in a 10 speed bicycle as shown, there are five rear sprockets, each containing a different number of teeth (e.g., 12 teeth on the smallest diameter sprocket and 28 teeth on the largest diameter sprocket).

The power output of the cyclist is equal to the amount of work done by the cyclist per unit time. One measurement of this power is given by the equation:

$$P(\text{watts}) = \text{chain speed (meters/sec)} \times \text{chain tension (Newtons)}$$

Thus, it is seen that power output is calculated from measurements of chain speed and chain tension.

Adverting to all of the drawings, the apparatus of the invention broadly comprises tension sensor 24, speed sensor 22 and computer module 35. The tension sensor measures the vibration of chain 18; the speed sensor measures the speed of the chain and the computer module calculates power output, which power output is calculated from the tension and speed values. The power output value is displayed on a LCD display which is integral with the computer module.

Figure 2:
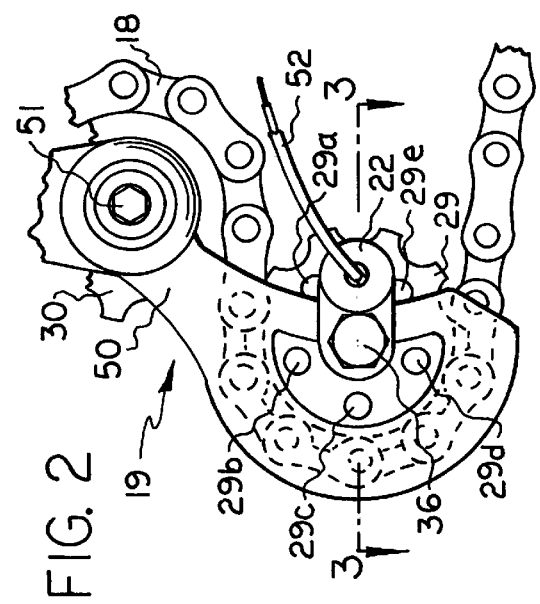
FIG. 2 is a fragmentary side view of the rear derailleur of the bicycle shown in FIG. 1 and a speed sensor mounted to the derailleur.

Chain speed is measured as the chain passes through the rear derailleur. As shown in FIG. 2, derailleur 19 comprises cage 50, pulley wheel 30 and jockey wheel 29. Both the pulley wheel and the jockey wheel are arranged for rotation within the cage. Pulley wheel 30 rotates about mounting bolt 51, whereas jockey wheel 29 rotates about mounting bolt 36. Chain 18 engages both pulley wheels and is operatively arranged to rotate pulley wheel 30 in a counterclockwise direction and jockey wheel 29 in a clockwise direction when the chain is driven in a clockwise rotation by front sprocket 16. Jockey wheel 29 comprises a plurality of embedded magnets 29a, 29b, 29c, 29d, and 29e. The magnets are AlNiCo in composition and are equally spaced radially and angularly. Although five magnets are shown in the drawing, any number of magnets can be used. In fact, the attached software code for the invention is written for four equally spaced magnets.

Figure 3:
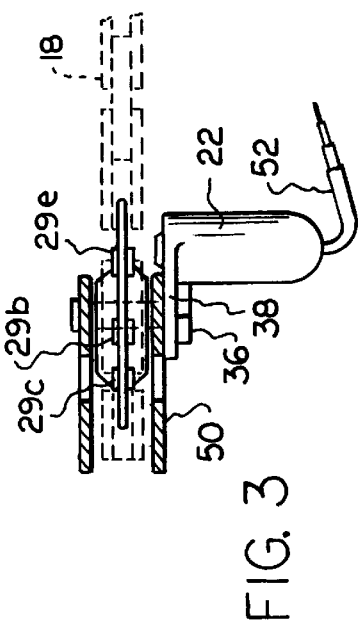
FIG. 3 is a cross-sectional view of the derailleur/sensor combination of FIG. 2, taken generally along line 3—3 of FIG. 2.

Speed sensor 22 comprises approximately 4000 turns of 40 gauge enamel coated wire, wound about a 0.125 inch diameter mild carbon steel dowel, which is then bent to form a U-shape. The winding has a resistance of approximately 200 ohms. Once the winding is made, it is potted in place with epoxy. As shown in FIGS. 2 and 3, sensor 22 is mounted to bracket 50 by bolt 36. The body of the sensor may have an integral mounting bracket 38 or may be mounted using any standard mounting means known in the art. The sensor may be a proximity sensor such as a simple reed switch or some other type of sensor including, but not limited to, magnetic, inductive, or capacitive sensors.

In operation, speed sensor 22 detects the movement of the magnets as pulley wheel 29 rotates. For a known pulley diameter, the linear speed of the chain can be derived from the measured rotational speed of the pulley wheel from the following equation:

$$v = \omega r$$

where v=linear chain speed;
ω=rotational chain speed; and
r=radius of the pulley wheel Although one means of measuring chain speed has been described in detail, it should be readily appreciated by those having ordinary skill in the art that other means of measuring chain speed are possible. For example, a magnet (or magnet ring containing multiple magnetic poles) can be mounted to one of the bicycle cranks. A speed sensor can be mounted to the bicycle's wheel. Crank speed, wheel speed, and a table of the bicycle's gear ratios then allows the calculation of chain speed. Alteratively, a magnet can be mounted to one of the cranks and the sensor can be a gear position indicator. This indicator would sense which of the bicycle's front sprockets is engaged with the chain. These sensors, along with a table of the bicycle's gear ratios then allows the calculation of chain speed. Finally, chain speed can be detected directly using a magnetic sensor, such as a variable reluctance (VR) sensor, a Hall Effect sensor or a magneto resistive sensor. This method measures the linear movement of chain pins past the sensor to produce a signal that is representative of chain speed.

The next step in determining power is to measure the vibration or tension of the drive chain. Examples of sensors that can be used to measure the vibration include but are not limited to variable reluctance sensors, Hall effect sensors, magneto resistive sensors, inductive, capacitive, optical and acoustic sensors. These sensors measure the frequency of vibration of the drive chain. In the case of a ferrous object, such as a bicycle chain moving past a magnetic-type sensor such as a variable sensor, an electric current is generated that is characteristic of the body's vibration. Such vibration results from excitation, or "plucking", which is a by-product of the normal operation of most devices, due to the inevitable friction and slight roughness of the tensioned body engaging with its drive or guide interfaces, such as rollers, sprockets, etc. In the case of a bicycle, this vibration is caused by the constant lateral and longitudinal accelerations of the bicycle, the motion induced by the individual rollers of the chain engaging and disengaging with the teeth of the drive sprockets, and the roughness of the surface on which the bicycle is being pedaled.

In a multi-speed bicycle the chain is capable of being shifted to a number of different sprockets at both the front and the rear. This causes the chain's position (relative to the bike) to change, but the overall length of the vibrating section remains essentially constant. This is because the chain engages drive sprockets at both ends of the tensioned section, and the position of the axis of rotation of these sprockets does not change. The constant length likewise means the mass of the vibrating section remains essentially constant.

Figure 4:
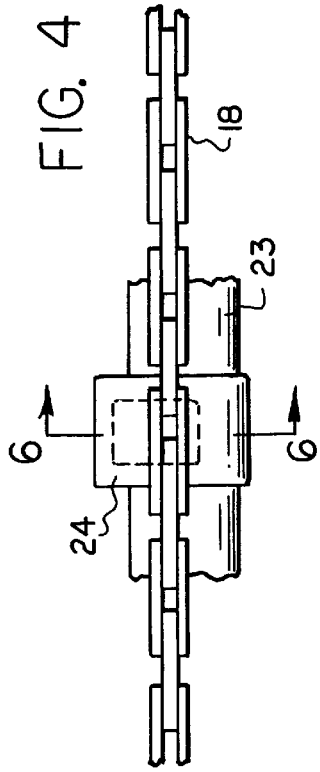
FIG. 4 is a fragmentary top view of the tension sensor of the invention.
Figure 5:
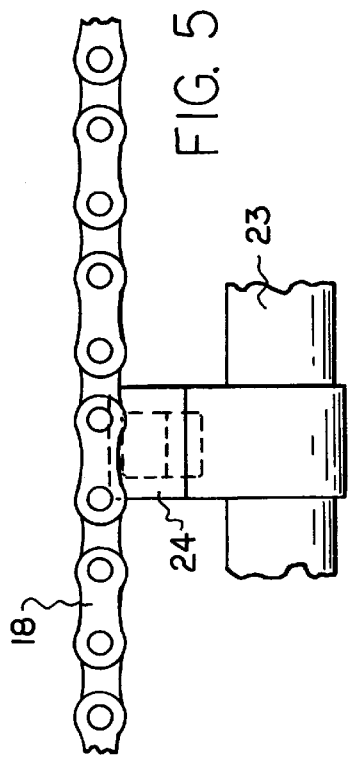
FIG. 5 is a side view of the sensor shown in FIG. 4.
Figure 6:
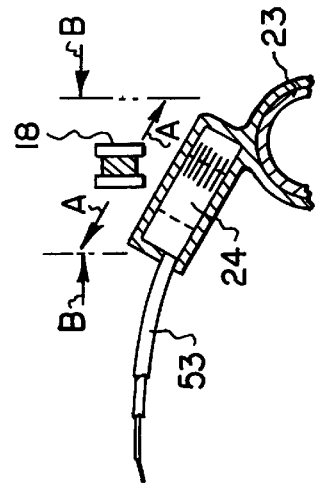
FIG. 6 is a cross-sectional view taken generally along line 6—6 in FIG. 4.

In a preferred embodiment, tension sensor 24 is a variable reluctance sensor (VR sensor). As shown in FIGS. 4 and 5, the VR sensor comprises a 1.0"×0.5"×0.25" rectangular AlNiCO magnet 40 wrapped with approximately 3000 turns of 40 gauge copper enamel coated wire having a resistance of 1.049 ohms/foot. The total resistance of the coil is approximately 1000 ohms. The faces of the magnet are laminated with rectangular carbonite plastic sheets. The winding is potted into place with epoxy. The sensor is housed in a plastic casing 42 and is mounted to chain stay 23, such that its face 44 is in close proximity to the upper run of chain 18. In a preferred embodiment, as shown more clearly in FIGS. 5 and 6, the sensor is mounted to the chain stay by means commonly known to those skilled in the art so that face 44 of the sensor is directly below the upper run of the chain. During the operation of the bicycle, as the chain is moved from sprocket to sprocket in the front and rear, thereby changing the gear ratio, the position of the chain changes depending upon the front and rear sprockets it is on. As shown in FIG. 6, the sensor is mounted at an angle so that face 44 of the sensor is at a constant distance from the chain irrespective of the sprockets being used by the rider. In a preferred embodiment, this angle is approximately 300. Nevertheless, a change in the distance between the sensor and the chain (due to shifting gears, for example) will affect the amplitude of the signal, but not the frequency. Since the tension in the chain is related to the frequency of vibration of the chain, and not the amplitude of vibration, the magnitude of excitation is not relevant to the tension measurement.

The natural frequency of vibration of a body such as a string or chain is related to the tension carried by the body. This relationship is defined by the equation:

$$F=4mlv^2$$

where:

F=force carried by body in Newtons m=mass of tensioned section of body in kilograms l=length of tensioned section of body in meters v=frequency of vibration in hertz.

In addition to the primary vibration that characterizes the tension in a body, other structures within the bicycle chain may cause extraneous signals. One such extraneous signal is caused by the pins of the bicycle drive chain moving past the sensor. Another extraneous signal is characteristic of the chain disengaging from the sprocket teeth. These extraneous signals can be filtered out during signal processing so as to leave only the primary vibration signal.

As previously described, the overall length of the vibrating section of the chain remains essentially constant because the axes of rotation of the sprockets at both ends of the chain section do not change. However, the length of the section of the chain that vibrates does not remain exactly constant as various front and rear sprockets are selected. If the sprockets being used are differing sizes, the length of the vibrating length will be reduced. Depending on the level of accuracy desired in the power measuring system, this variation can be ignored, as in many circumstances, the error introduced will be insignificant. In those cases, it is sufficient to perform calculations using a constant value for the length of the vibrating section of the chain. This value can be either the distance between the centers of the sprockets, or that value reduced by a small amount.

If greater accuracy is desired, or if there will be large variation in the sizes of the sprockets used, the exact vibrating length can be calculated. The vibrating length is, in mathematical terms, the length of a line segment that is externally tangent to the circles formed by the two sprockets. In mathematical terms, the length of such a segment is:

$$L=D * sqrt(1-((R1-R2)/D)**2)$$

where:

L=the desired length of the vibrating section

D=the distance between the centers of the two sprockets (this value does not change as the gears are shifted)

R1=the radius of one of the sprockets

R2=the radius of the other sprocket

The radius of a sprocket can be calculated from the number of teeth on the sprocket by means of the formula:

$$R=T * P/(2 * PI)$$

where:

R is the desired radius

T is the number of teeth

P is the pitch (distance between adjacent teeth)

The sizes of the sprockets can be determined in various ways. If the shifting mechanism provides information as to what sprocket from a set has been selected, or if sensors are fitted to determine which sprockets the chain is actually on, then the sprocket sizes can be determined from a list of available sprockets.

Alternatively, if the chain linear speed, and the rotational speed of the two sprockets are known, sprocket sizes can be determined without prior information about what sprockets are available. The rotational speeds of the sprockets are commonly measured on bicycles, with the speed of the front sprocket used to calculate cadence, and the speed of the rear sprocket (which is equivalent to the speed of the bicycle wheel) used to calculate bicycle speed. This determination of the sprocket is by means of integrating the chain speed over one rotation of the desired sprocket. In a preferred embodiment, the chain speed sensor will detect links of the chain directly, and the links can be counted over the period of one revolution of the sprocket in question. To reduce the errors due to rounding the links can be counted over two or more revolutions and divided by the number of revolutions. Alternatively, if the size of one sprocket has been determined, the size of the other sprocket may be obtained by multiplying the size of the first sprocket by the ratio in speeds between the two sprockets.

The tension sensor and the speed sensor are electrically connected to the computer module, which contains a signal processing unit. The module contains a liquid crystal display (LCD) and keyboard. The module is typically mounted on the handlebars for easy viewing during cycling, although it can be mounted in any convenient location. In a preferred embodiment, the computer module comprises a Texas Instruments TMS32OC3X Starter Kit, and an additional circuit board which comprises the peripheral interface circuit. The basic components of the TMS32OC3X DSP Starter Kit are the TMS32OC31 DSP, a TLC32040 analog interface circuit (AIC), expansion connectors, system clock, parallel printer port interface, and tri-color LED.

Figure 7:
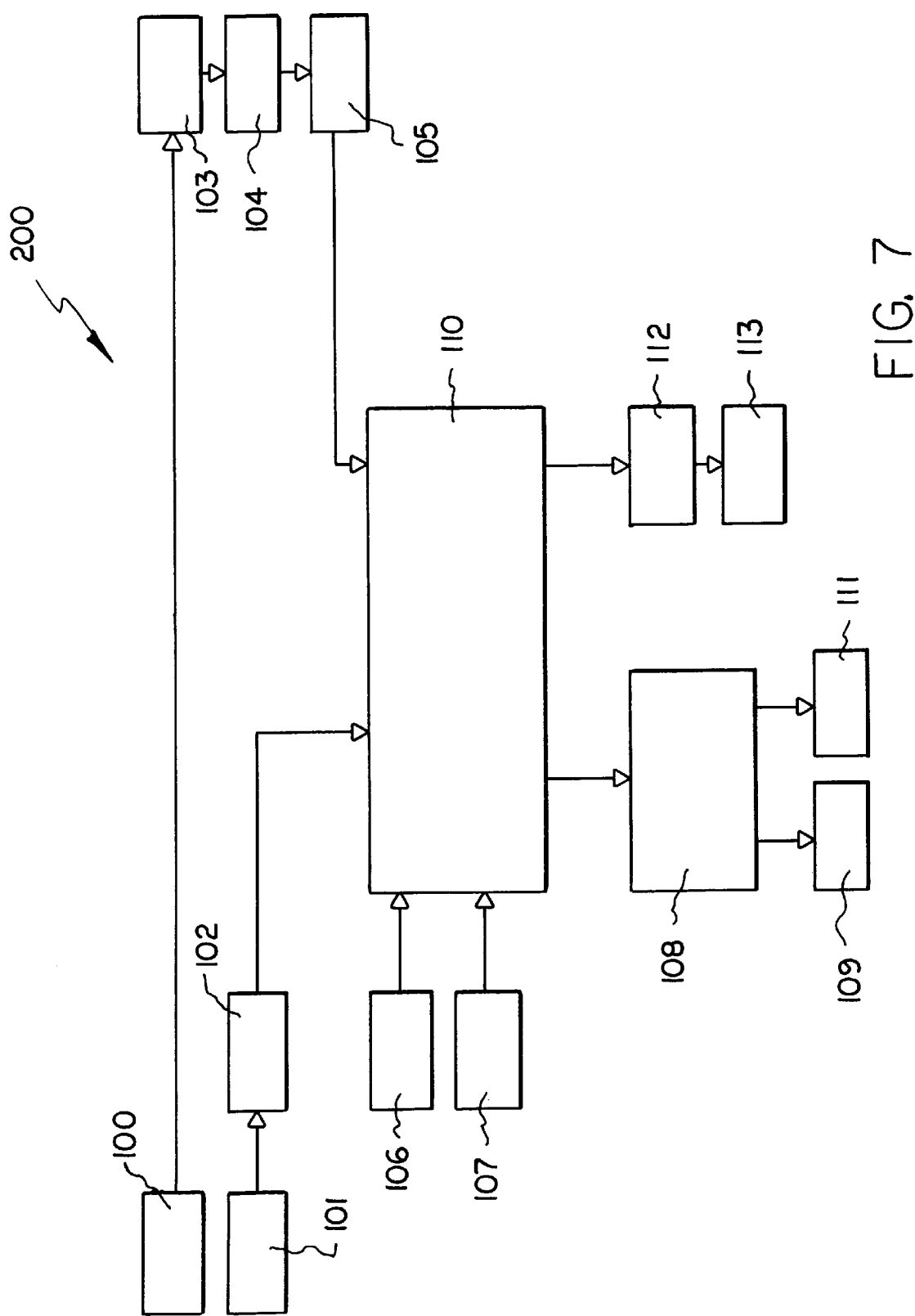
FIG. 7 is a schematic block diagram of the electrical and electronic circuit of the apparatus of the invention.
Figure 8B:
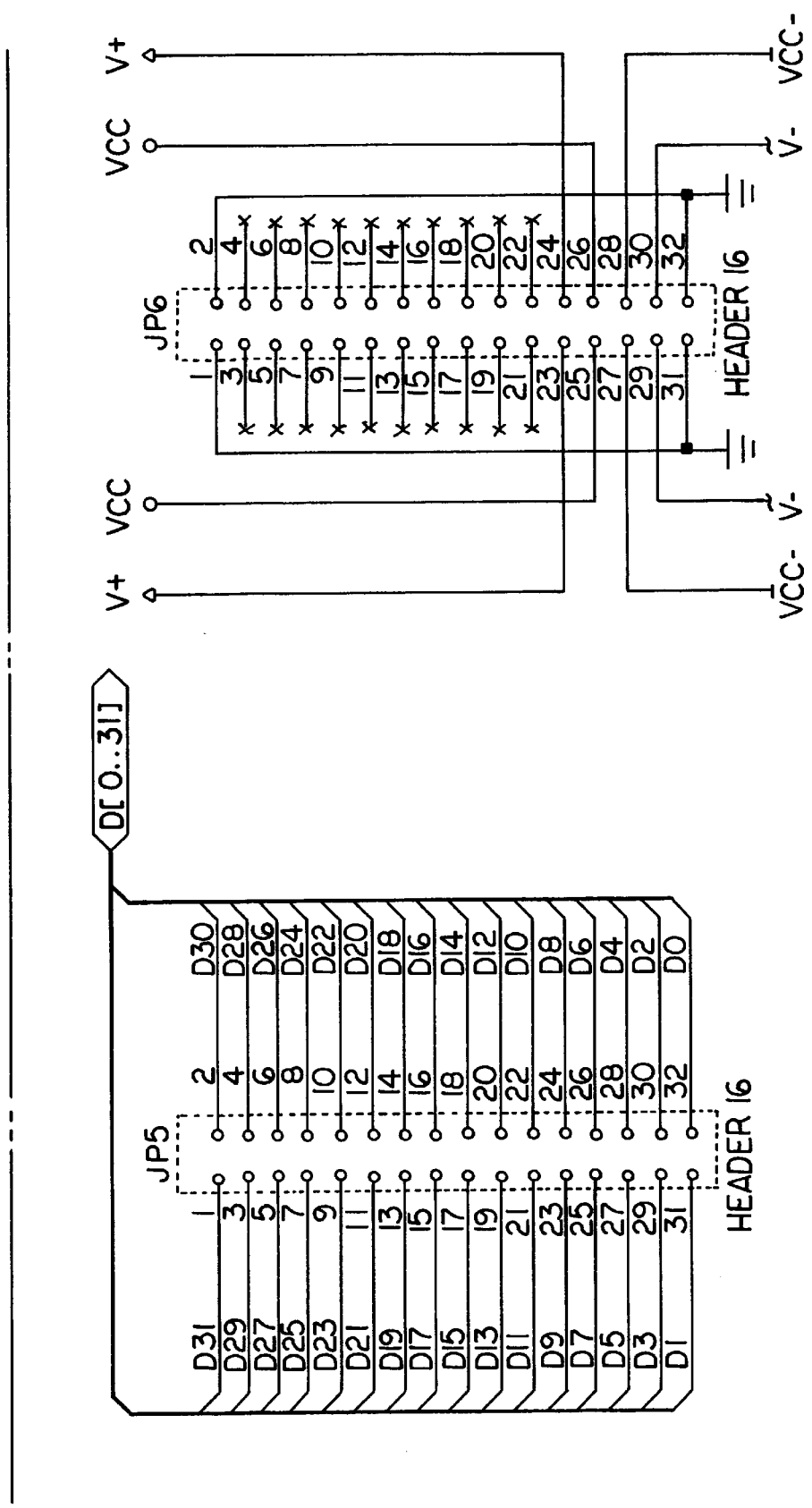
FIG. 8 is an electrical schematic diagram of the connectors used to connect the peripheral interface circuit to the computer processing unit.
Figures 9, 9A:
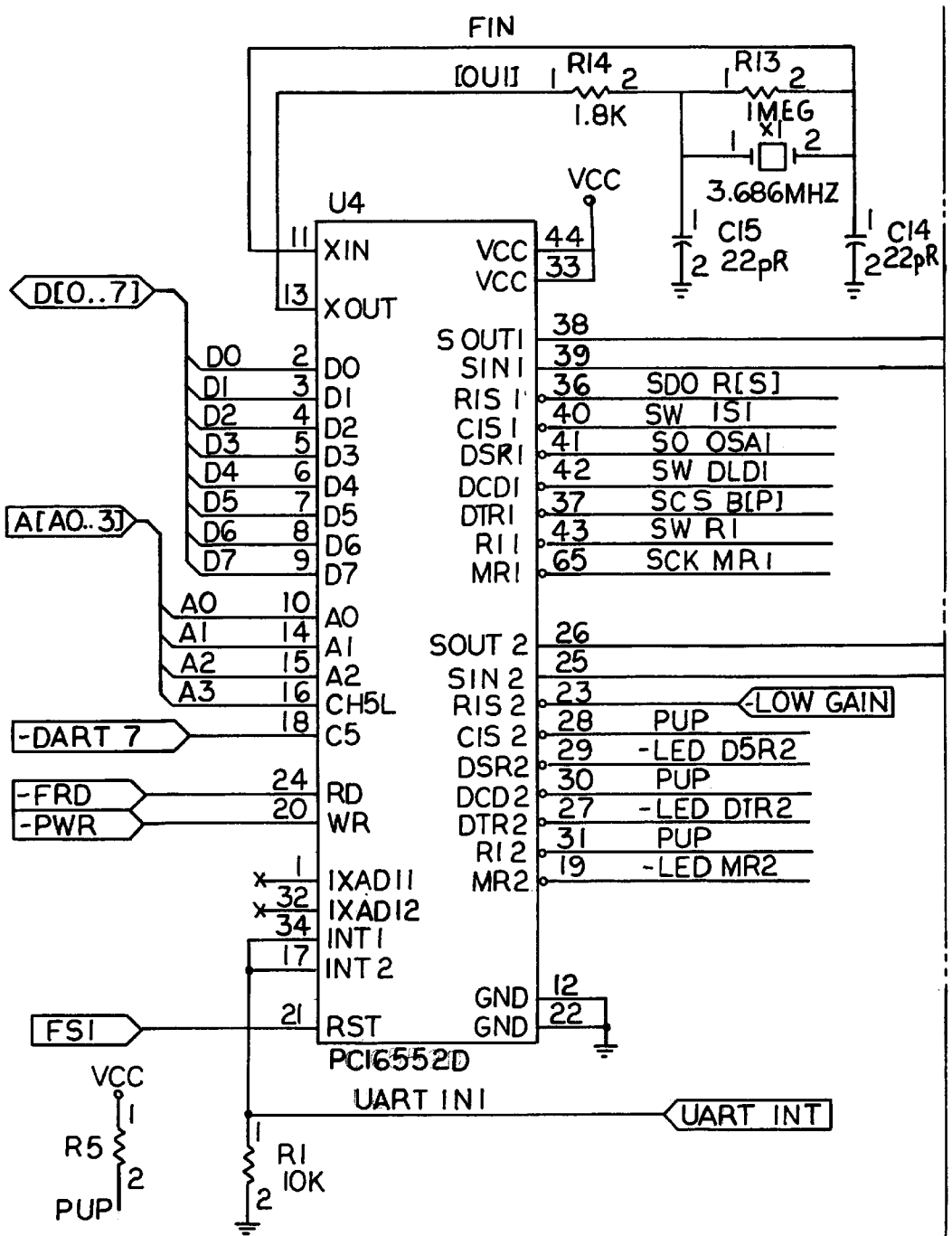
FIG. 9 is an electrical schematic diagram of part of the peripheral interface circuit of the invention.
Figure 9B:
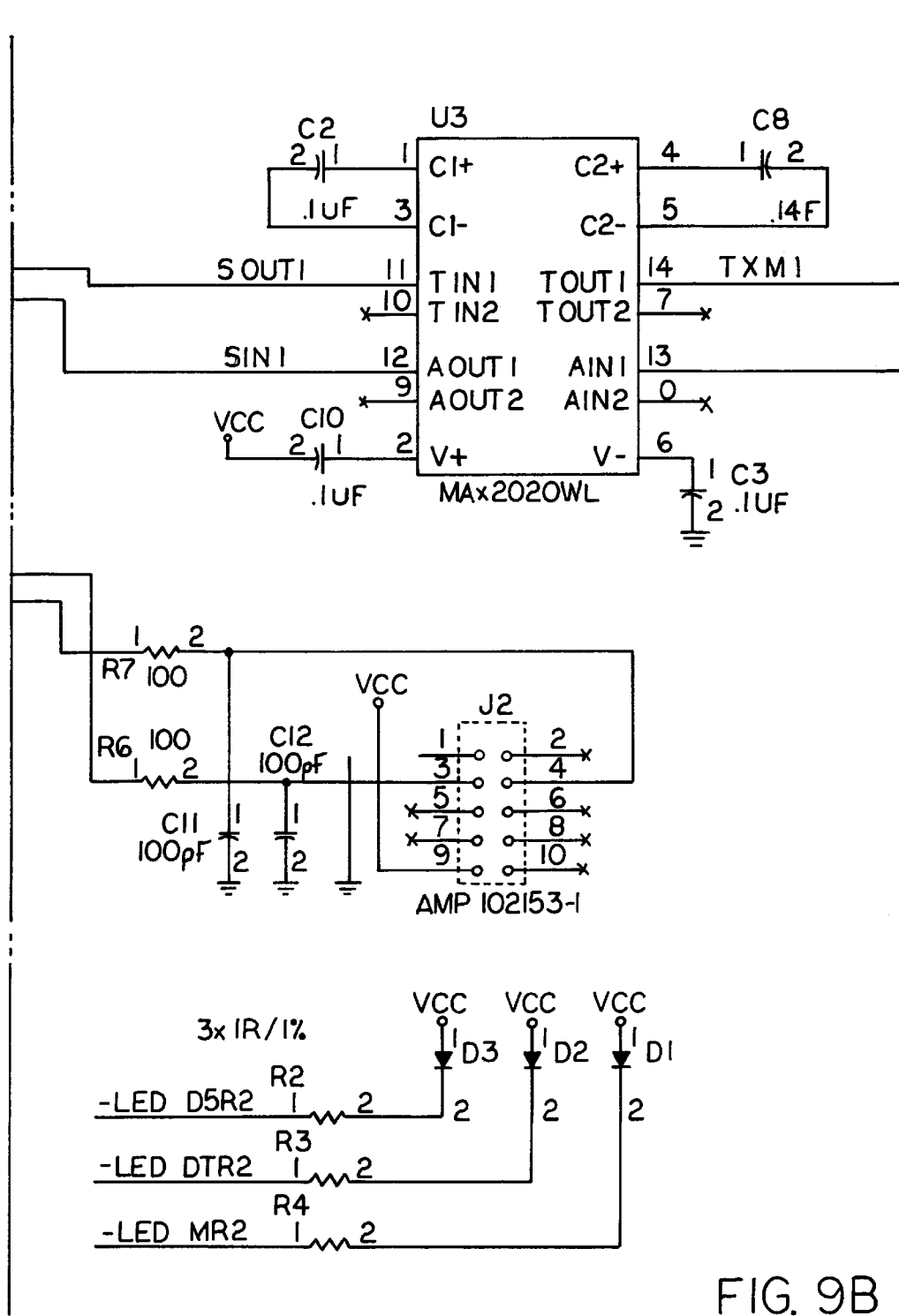
Figure 9C:
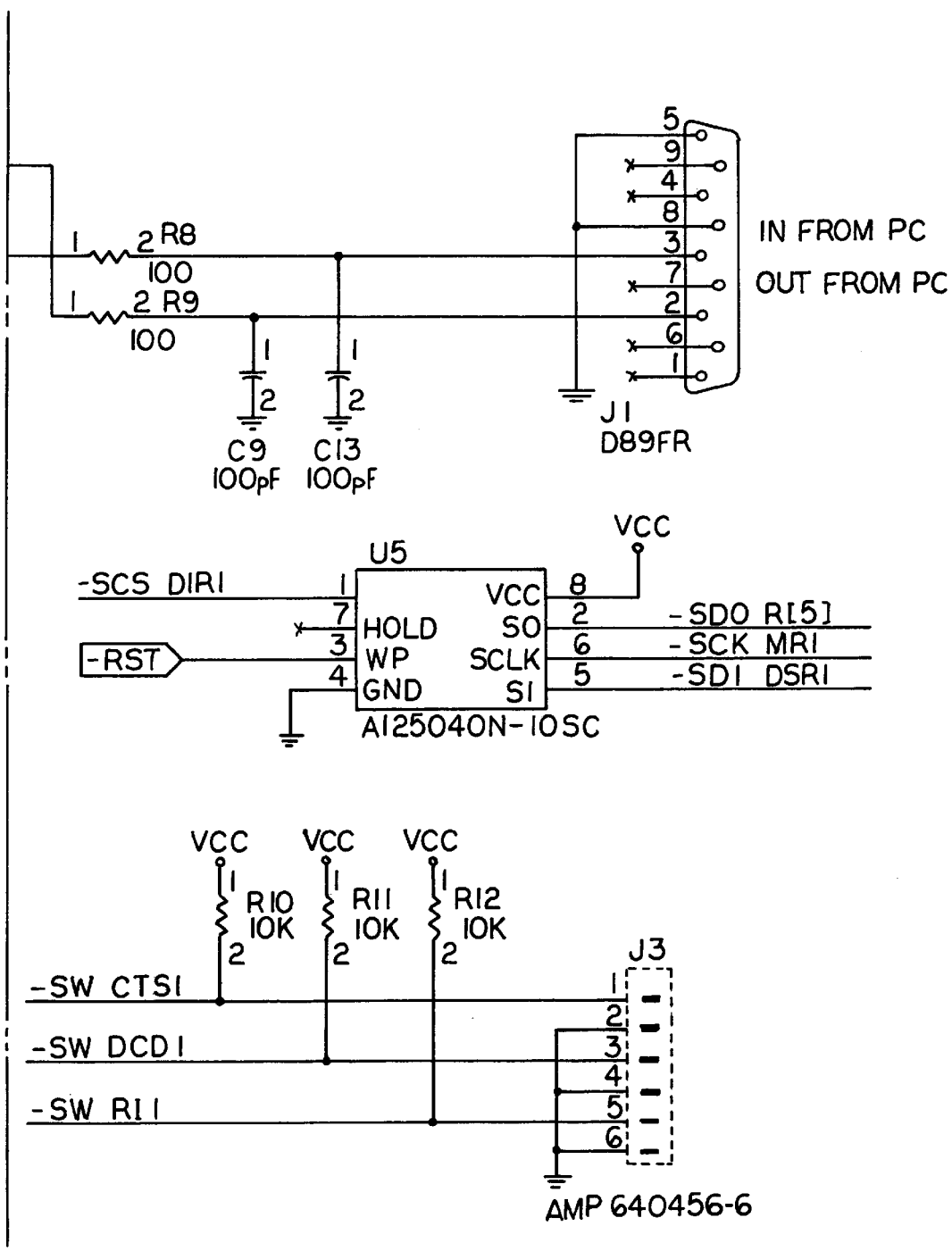
Figure 10A:
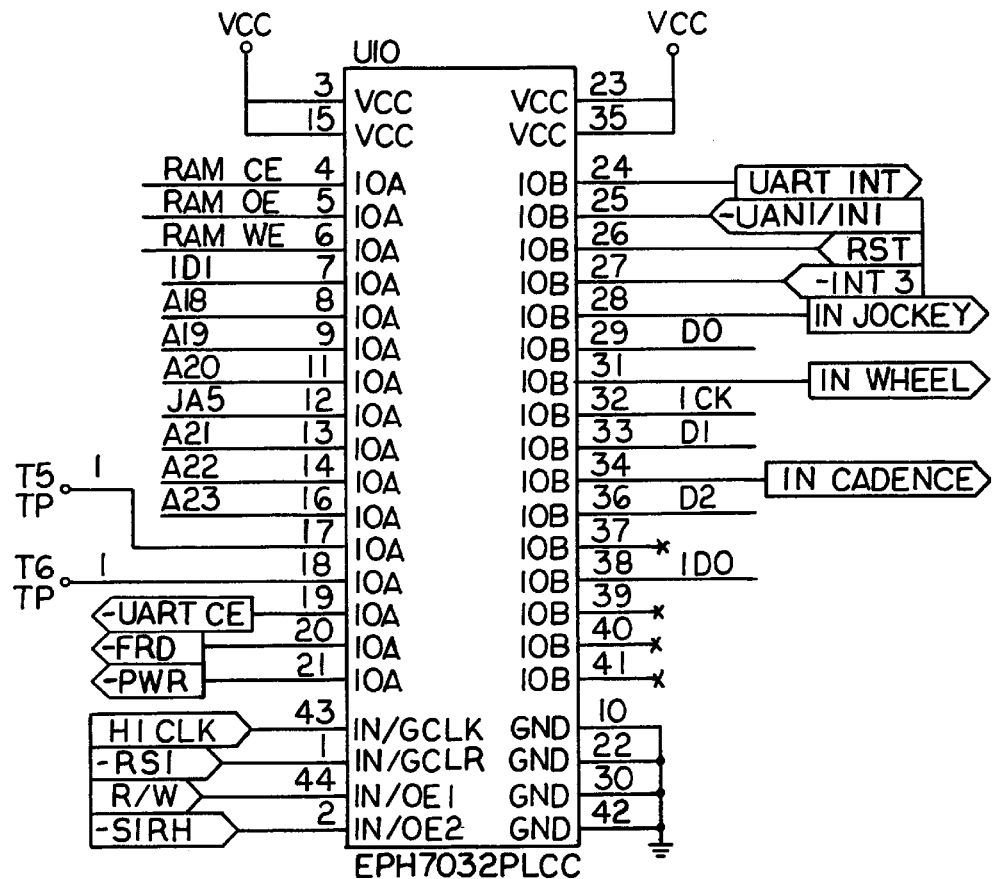
FIG. 10 is an electrical schematic diagram of part of the peripheral interface circuit of the invention.
Figure 10B:
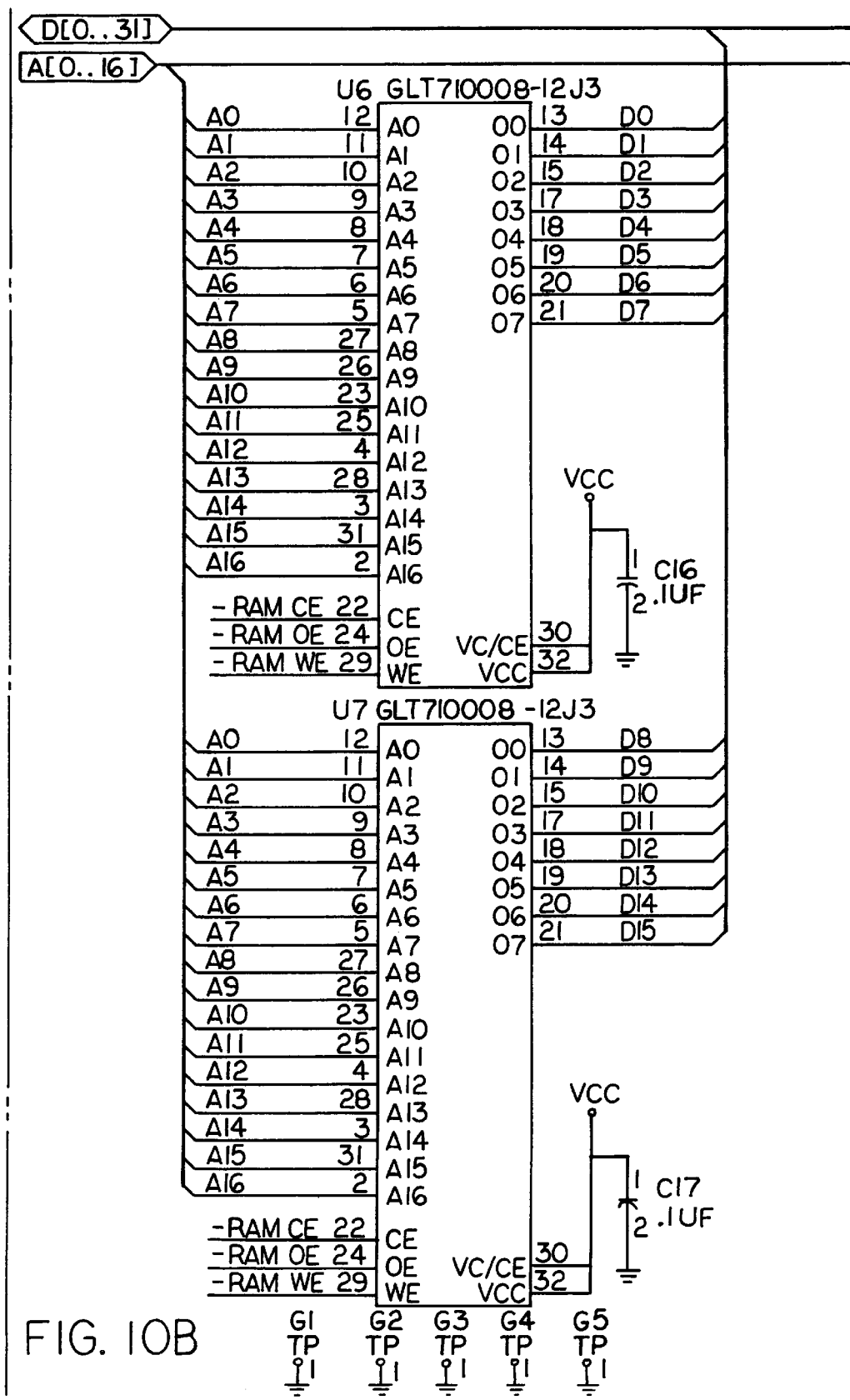
Figure 10C:
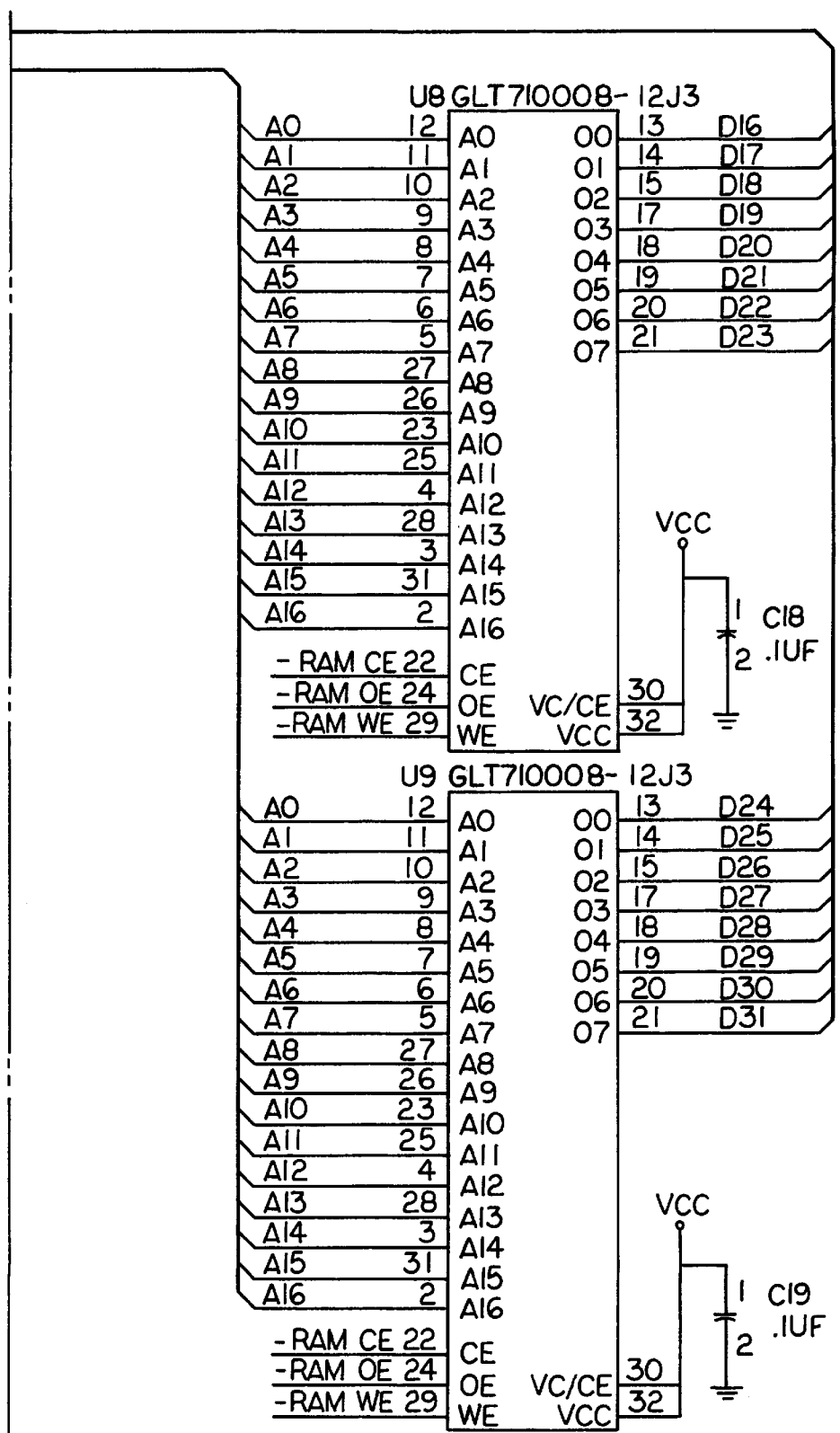
Figure 11A:
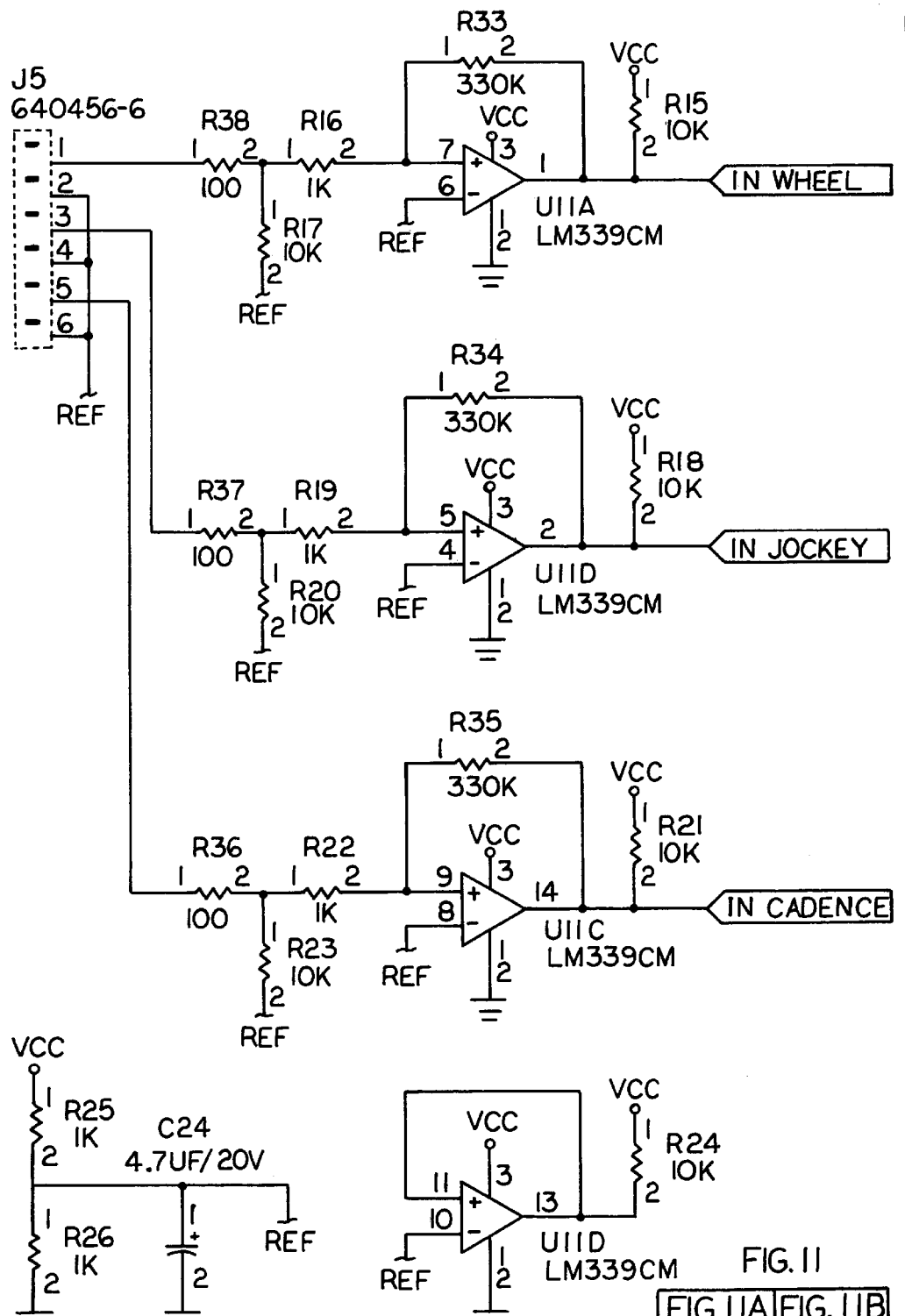
FIG. 11 is an electrical schematic diagram of part of the peripheral interface circuit of the invention; and, FIG. 12 is a flow chart of the computer program operatively arranged to run the digital signal processor of the invention.
Figure 11B:
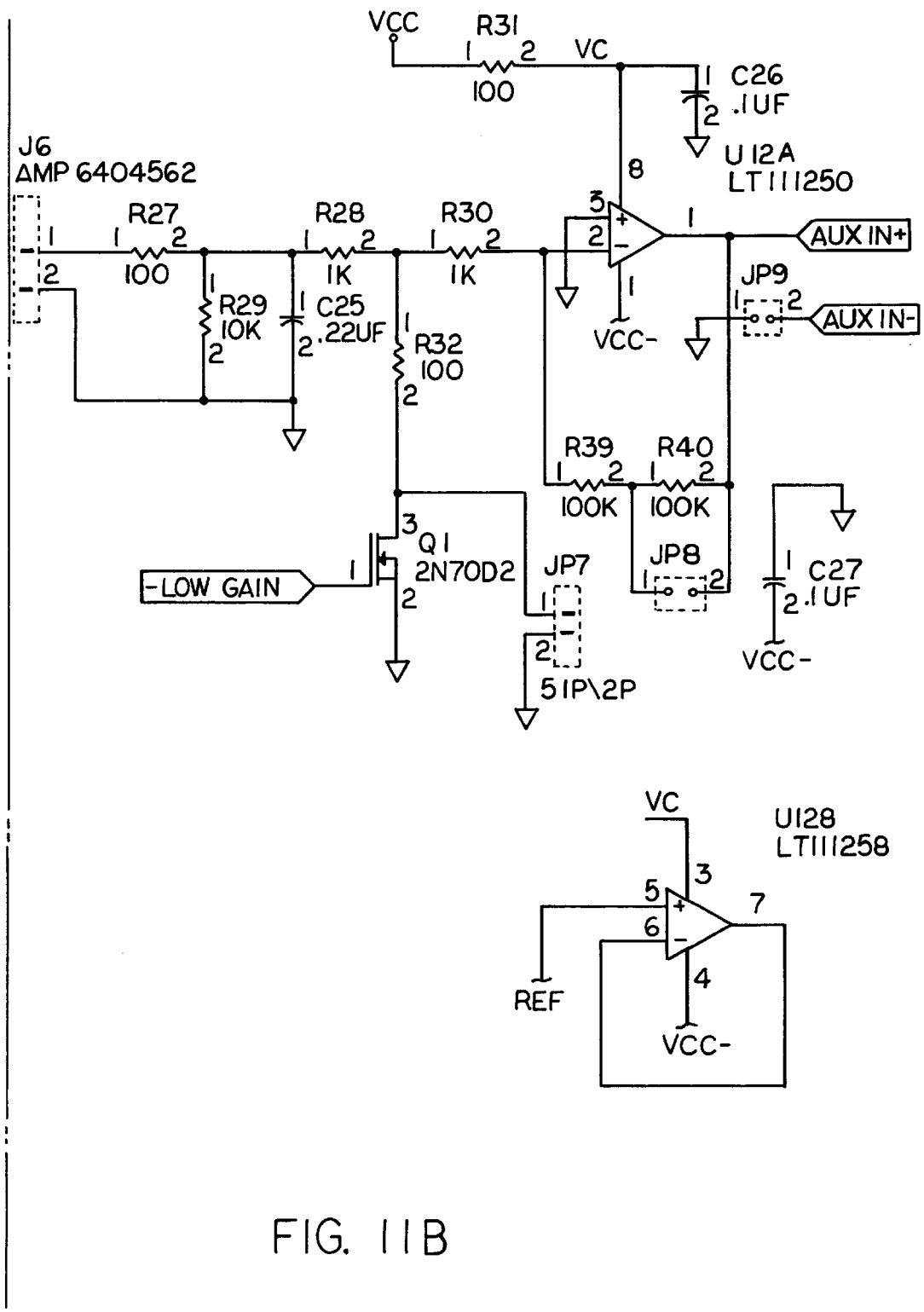

The operation of the electronic circuitry of the invention is best understood with reference to FIG. 7, which illustrates a general schematic and block diagram of the invention. In this drawing, block 100 represents tension sensor 24. As the chain vibrates in the vicinity of this sensor, a signal with a voltage in the range of approximately 2 mV to 200 mV is produced. The relevant signal due to the frequency characteristic of the tension in the chain will be one component of this signal, but it may be accompanied by other signal components. The output signal from this sensor is fed to block 103, which represents the chain vibration amplifier.

Amplifier 103 amplifies the chain vibration signal to a level that is appropriate for circuit components 104 and 105. The gain level can be adjusted two different ways, for four different gain settings. One adjustment is via jumper JP8, and the other is by means of the low gain signal, which is under control of the microprocessor. Although the amplitude of the signal from sensor 100 can vary, the dynamic range of circuit components 104 and 105 is high enough that the gain level should not need to be adjusted during operation; these two adjustments can be made once and left alone. The output of this section is an amplified version of its input, and is fed to circuit components 104 and 105.

Circuit component 104 is a low-pass filter and component 105 is a 14 bit A/D converter. These two circuits are both contained in the Texas Instruments TLC32040 AIC part on the Starter Kit board. This part can be configured to convert its analog input to a 14-bit digital stream, sampled at 7200 Hz, and it includes a Nyquist frequency low-pass filter to eliminate aliasing. The digital output of this section is read by the DSP (circuit component 110) for frequency calculations.

Component 101 contains chain speed sensor 22 as described previously. The sensor comprises a wire coil mounted on rear derailleur cage 50. Jockey wheel 29 of the derailleur contains embedded magnets 29a, 29b, 29c, 29d and 29e that induce a voltage in the coil as they pass by. This results in an oscillating signal whose frequency is directly proportional to the rotational speed of the jockey wheel, and consequently, to the linear speed of the chain that is driving the jockey pulley. The amplitude of this signal is typically in the range of 20 mV to 2 V. This signal is fed to hysteresis circuit 102. It should be noted that, although five magnets are embedded in the jockey wheel in the preferred embodiment, any number of magnets can be embedded. Also, other means of measuring chain speed may be employed.

Hysteresis circuit 102 converts the output signal of chain speed sensor 101 from its low voltage level to a TTL level that can be read by digital signal processor (DSP) 110. Intermediate level information is not of interest—only the fundamental frequency due to the passing of each jockey wheel magnet is relevant. For this reason, the circuit consists of a Schmitt Trigger, which has very high gain to "clip" the signal, and which has hysteresis to suppress any low-level noise that may be present in the signal. The result is a pulse train with each pulse corresponding to one of the jockey wheel magnets. This signal is input to digital signal processor 110.

Digital signal processor (DSP) 110 and random access memory (RAM) 106 operate together to perform the power calculations. In a preferred embodiment, the DSP is a Texas Instruments Model No. TMS32OC31. The RAM contains the program code for this device (although such code could also be stored in a ROM chip connected to the DSP in an analogous manner). The DSP calculates power based on two inputs. The first is the signal from circuit component 102, which can be used to determine the linear speed of the chain (given the fixed values of how many magnets are on the jockey wheel, and how many teeth are on the jockey wheel). The second is the signal from circuit components 104 and 105, which can be used to determine the vibrational frequency of the chain, and in turn the tension of the chain (the speed of the chain, determined from the jockey wheel signal, is also used to assist in selecting the proper component from the output signal of circuit components 104 and 105). The tension of the chain is multiplied by the speed of the chain to give a result of the power transmitted through the chain at any instant. The method used to do this calculation is described fully in the attached computer code for the DSP.

In operation, a chain signal is "downsampled" from 7200 Hz to 450 Hz to make the calculation more manageable. Next, a Fast Fourier Transform (FFT) is performed on the signal. From the strongest frequency components, a heuristic is used to select the chain vibrational frequency, based upon the last observed chain vibration frequency, as well as the current chain speed. Using this selected frequency, the chain tension is calculated. Chain speed is calculated by counting the time between the rising edges of the jockey wheel signal. The process of sampling at 7200 Hz and downsampling to 450 Hz is made necessary only by the fact that 7200 Hz is the slowest operational speed of the TLC32040 which can be used to interface with an analog interface circuit operating at 450 Hz.

Memory 107 is a non-volatile memory chip, such as a serial EEROM. The DSP is operatively arranged to write and read data to and from memory 107. Memory 107 is used to store installation-specific information such as chain-line length and chain linear density.

Circuit components 108 (liquid crystal display (LCD)), 109 (keyboard/CPU), and 111 (keyboard) comprise a simple "terminal" operating at TTL voltage levels and typically arranged to be mounted on the handlebars of the bicycle. The DSP can send the calculated power value (or any other relevant information) to this CPU, which will display the information on the LCD. Key presses on the keyboard will result in information being sent to the DSP, which can respond with some appropriate action (e.g., changing the displayed power value from watts to horsepower.) Any suitable user interface can be implemented. These three components comprise a standard off-the-shelf unit manufactured and available by Bolton Engineering of Melrose, Mass. In a preferred embodiment, a Bolton unit which uses a Microchip PIC16C63 processor was used. Of course, other processor units would also function satisfactorily.

Circuit component 112 is an optional RS232 interface, well known to those having ordinary skill in the art. This interface converts the TTL signal levels of the UART connected to the DSP into RS232 levels for communication with an external device such as a personal computer (PC). The DSP can use this interface to upload a series of saved power values to a host PC for analysis.

Component 113 is a host PC. This PC is an external device which is not used in normal operation of the invention. It can be any sort of computer that can retrieve information from the power meter device for further processing. It would typically be connected to the power meter at the completion of a bicycle ride.

FIGS. 8–11 are electrical schematic diagrams of the peripheral interface circuit of the invention. The peripheral interface circuit connects the several peripheral devices of the invention (e.g., RAM, keyboard, display, etc.) to the Texas Instruments TMS32OC3X DSP Starter Kit board.

Figure 12:
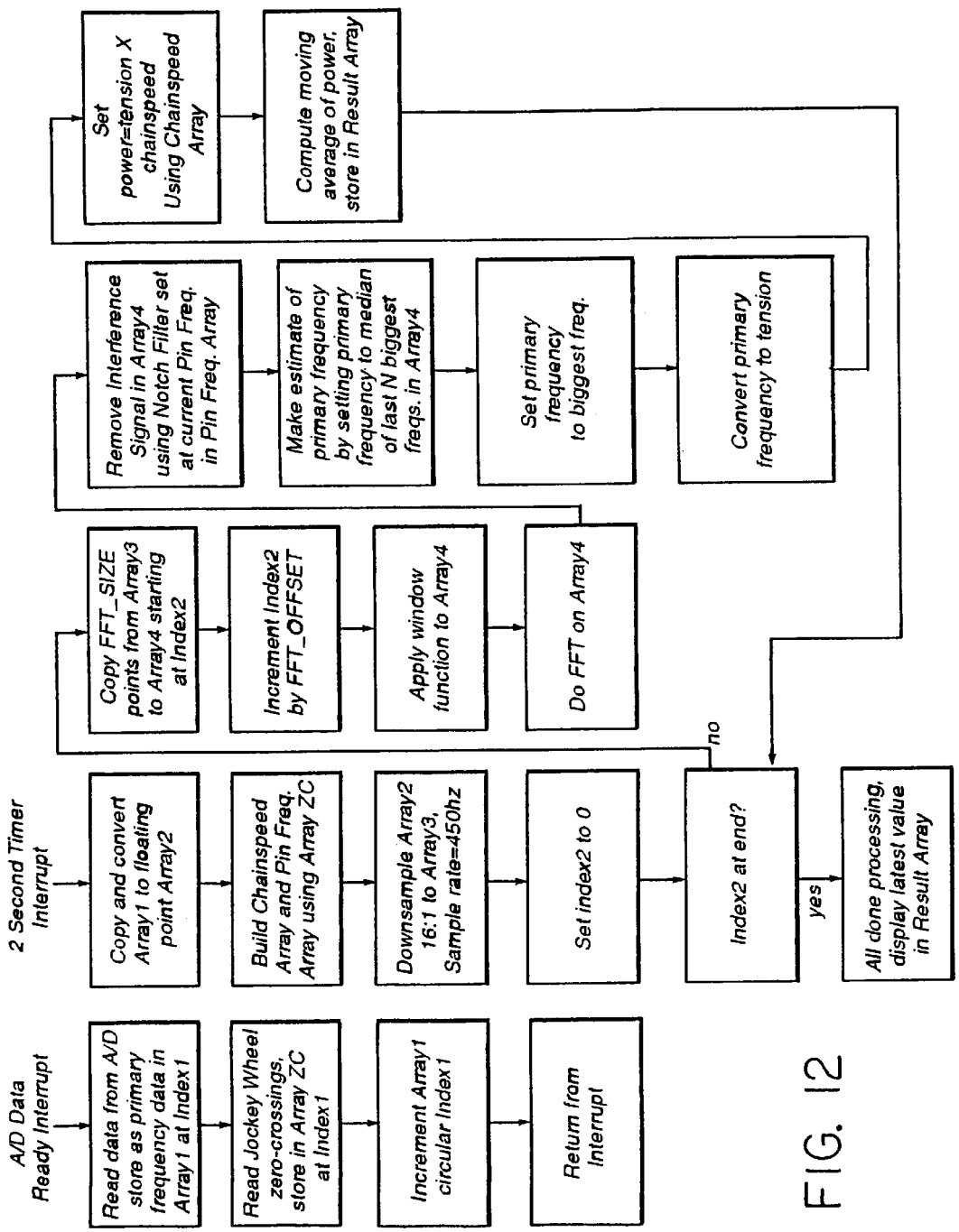

FIG. 12 is a flowchart of the computer code used to run the DSP in a preferred embodiment of the invention. The code itself is as follows:

- 15 -

```
/******************************************************************
dsp.c - processing code for powermeter monitoring system Copyright 1997 - CC Kinetics, All Rights Reserved This code must be called every 2 seconds with
        BLOCK_SIZE number of struct sJockAD(s).  Each struct
        has a member for a/d data and jockey zero-crossing
        data.  The a/d data must be in integer offset notation,
        where the offset is specified by the macro AD_OFFSET.
        The jockey data is a one-bit value, where a crossing is
        represented by a 1 and a non-crossing by zeros.

Invoke the function ProcessPowerInit to
        initialize the processing code.  Call the
        function ProcessPower every 2 seconds with
        a/d and zero crossing values as the first
        argument.  Results are returned through the
        function's second argument.

******************************************************************/
#include<stdio.h>
#include<math.h>
#include<malloc.h>
include<string.h> define RAW_SAMP_FREQ         7200
define RAW_SAMP_PERIOD           ((float)1/(float)RAW_SAMP_FREQ)
#define RESAMPLE_FACTOR          16
#define FFT_SIZE                 64
#define FFT_OFFSET               4
#define BLOCK_PERIOD_SEC         2
#define BLOCK_SIZE                (RAW_SAMP_FREQ *
BLOCK_PERIOD_SEC)
#define BLOCK_SIZE_RESAMPLE    (BLOCK_SIZE/RESAMPLE_FACTOR)
#define NUM_FFT_PER_BLOCK     ((BLOCK_SIZE_RESAMPLE-FFT_SIZE+
FFT_OFFSET)/FFT_OFFSET)
#define AD_OFFSET              0x80
#define NUM_INTERVALS          3
#define JOCK_REV_RATIO         4
#define JOCK_NUM_TEETH            10
#define PINS_PER_METER        ((float)78.7)
#define M_PI                  3.14159265358979323846
#define M_2PI                 (2.0*M_PI)
#define SQ(x)                 ((x)*(x))
#define MIN_RPM                   ((float)20.0)
#define MAX_RPM                   ((float)200.0)
```

- 16 -

```
#define MIN_CHAINRING       ((float)24.0)
#define MAX_CHAINRING       ((float)60.0)
#define MIN_PIN_FREQ        (MIN_RPM * MIN_CHAINRING/(float)60)
#define MAX_PIN_FREQ        (MAX_RPM * MAX_CHAINRING/(float)60)
#define MIN_JOCK_FREQ       (MIN_PIN_FREQ * JOCK_REV_RATIO/
JOCK_NUM_TEETH)
#define MAX_JOCK_FREQ       (MAX_PIN_FREQ * JOCK_REV_RATIO/
JOCK_NUM_TEETH)
#define PAD_SIZE            ((int)(RAW_SAMP_FREQ/MIN_JOCK_FREQ))

#define BINS_PER            ((FFT_SIZE/2)+1)
#define SAMP_FREQ           (RAW_SAMP_FREQ/
(float)RESAMPLE_FACTOR)
#define SAMP_PERIOD         ((float)1/(float)SAMP_FREQ)
#define NUM_FFT_PER_SEC         (SAMP_FREQ/FFT_OFFSET)
#define WINDOW_LOBE_WIDTH   9
#define INTERVAL_1_SEC      2
#define INTERVAL_2_SEC      5
#define INTERVAL_3_SEC      10
#define NUM_FFT_PER_1_AVE   ((int)(INTERVAL_1_SEC *
NUM_FFT_PER_SEC))
#define NUM_FFT_PER_2_AVE   ((int)(INTERVAL_2_SEC *
NUM_FFT_PER_SEC))
#define NUM_FFT_PER_3_AVE   ((int)(INTERVAL_3_SEC *
NUM_FFT_PER_SEC))
#define MAX_AVERAGE_WINDOW      ((int)NUM_FFT_PER_3_AVE)
#define MAX_FILTER_COEF     41
#define BIN2FREQ(b)             (((float)b)/((float)FFT_SIZE/
SAMP_FREQ))
#define FREQ2BIN(f)         ((f) * ((float)FFT_SIZE/SAMP_FREQ))
#define PINHZ2SPEED(f)      ((f)/PINS_PER_METER)
#define ATTEN_NOTCH_DB          ((float)30)
#define MM2M                    ((float)1000)

extern float fChainLength_mm;
extern float fChainLinearDensity;
extern Int nChainring;

struct sPowerAve {
    int nTwang[NUM_INTERVALS];
    int nPinHz[NUM_INTERVALS];
    int nPower[NUM_INTERVALS];

};

struct sPowerArray {
    float fTwang[NUM_FFT_PER_BLOCK];
    float fPinHz[NUM_FFT_PER_BLOCK];
    float fPower[NUM_FFT_PER_BLOCK];
```

- 17 -

```
};

struct sPowerSet {
    struct sPowerAve ave;
    struct sPowerArray array;
};

struck sJockAD {
    unsigned int jock:1;
    unsigned int ad:31;
};

struct sCmplex {
    float re,im;
};

struct sFiltCoef{
    int num;
    float coef[MAX_FILTER_COEF];
};

struct sFiltCoefHistory {
    struct sFiltCoef filt;
    float history[MAX_FILTER_COEF];
};

struct sAverageFilter {
    int length;
    int index;
    int count;
    float value[MAX_AVERAGE_WINDOW];
};

static struct sComplex cData[FFT_SIZE];
static struct sAverageFilter AveTwang[NUM_INTERVALS],AvePinHz
[NUM_INTERVALS],AvePower[NUM_INTERVALS];
static struct sFiltCoefHistory decFilter;
static int nFftCount;
static int nBlockCount;
```

- 18 -

/*****************************************************************

FilterLP4000-FIR filter, LP=300hz, direct realization, 30db
atten.

*****************************************************************/

```
static struct sFiltCoefFilterLP4000={
      41,
 -0.005125881425025383,
  0.002582302150794436,
  0.01052733850165874,
  0.01681942643599849,
  0.01973515196700159,
  0.01812679354307367,
  0.01174820956906760,
  0.001421601768124991,
 -0.01100256787642489,
 -0.02290073789531828,
 -0.03131135456545855,
 -0.03347630998683525,
 -0.02738957008440296,
 -0.01224700060318999,
  0.01129467944240988,
  0.04110924668809402,
  0.07385658812070439,
  0.1054668790709014,
  0.1317734248780911,
  0.1491843151328381,
  0.1552734374999997,
  0.1491843151328384,
  0.1317734248780913,
  0.1054668790709016,
  0.07385658812070449,
  0.04110924668809407,
  0.01129467944240987,
 -0.01224700060319003,
 -0.02738957008440303,
 -0.03347630998683532,
 -0.03131135456545862,
 -0.02290073789531832,
 -0.01100256787642492,
  0.001421601768124995,
  0.01174820956906763,
  0.01812679354307370,
  0.01973515196700161,
  0.01681942643599851,
  0.01052733850165875,
  0.002582302150794424,
 -0.005125881425025422
```

- 19 -

```
};
/******************************************************************
log2
******************************************************************/
static int log2(unsigned int x)
{
unsigned int mask,i;
    if(x==0)
            return-1;

x--;

mask=1;
        i=0;
        while(1){
    if(x==0)
            return(i);

x=x&(~mask);

mask *=2;
            i++;
}
}
/******************************************************************
windowGaussian
******************************************************************/
static void windowGaussian(float data[], int N, int a)
{
int n;
static int Nstore=0;
static int Astore=0;
static float IoAlpha;
static float *W;

if(Nstore!=N||Astore!=a){ if(Nstore)
                free(W);

Nstore=N;
```

```
                Astore=a;
                W=(float *)malloc(sizeof(float) * N);
                for (n=0; n<N; n++)
                        W[n]=((float)1/((float)pow(M_PI,0.25f)*
(float)sqrt((float)a))) *
(float)exp(-((n-N/2)*(n-N/2)/(2.f*(float)a*(float)a)));
        }
        for (n=0; n<N; n++)
                data[n] *=W[n];
}
/****************************************************************
fft
****************************************************************/
static void fft(struct sComplex *x, int mm)
{
static struct sComplex *w;
static int mstore=0;
static int n=1;

struct sComplex u,temp,tm;
struct sComplex *xi,*xip,*xj,*wptr;

int i,j,k,l,le,windex;
int m=log2((unsigned int)mm);

float arg,w_re,w_im,wrecur_im,wtemp_re;

if(m!=mstore){
                if(mstore)!=0)
                        free(w);
                mstore=m;
                if(m==0)
                        return;

n=1<<m;
                le=n/2;
                w=(struct sComplex *)calloc(le-1,sizeof(struct
sComplex));
                if (!w)
                        return;

arg=(float)(M_PI/le);
```

```
            wrecur_re=w_re=(float)cos(arg);
            wrecur_im=w_im=(float)-sin(arg);
            xj=w;

for (j=1;j<le;j++){
                xj->re=(float)wrecur_re;
                xj->im=(float)wrecur_im;
                xj++;
                wtemp_re=wrecur_re*w_re-wrecur_im*w_im;
                wrecur_im=wrecur_re*w_im+wrecur_im*w_re;
                wrecur_re=wtemp_re;
            }
    } le=n;
    windex=1;
    for(l=0;l<m;l++){
        le=le/2;

for(i=0;i<n;i=i+2*le){
            xi=x+i;
            xip=xi+le;
            temp.re=xi->re+xip->re;
            temp.im=xi->im+xip->im;
            xip->re=xi->re-xip->re;
            xip->im=xi->im-xip->im;
            *xi=temp;
        } wptr=w+windex-1;
        for(j=1;j<le;j++){
            u=*wptr;
            for(i=j;i<n;i=i+2*le){
                xi=x+i;
                xip=xi+le;
                temp.re=xi->re+xip->re;
                temp.im=xi->im+xip->im;
                tm.re=xi->re-xip->re;
                tm.im=xi->im-xip->im;
                xip->re=tm.re*u.re-tm.im*u.im;
                xip->im=tm.re*u.im+tm.im*u.re;
                *xi=temp;
            }
            wptr=wptr+windex;
        }
        windex=2*windex;
    } j=0;
    for(i=1;i<(n-1);i++){
```

- 22 -

```
            k=n/2;
            while(k<=j){
                    j=j-k;
                    k=k/2;
            }
            j=j+k;
            if(i<j){
                    xi=x+i;
                    xj=x+j;
                    temp=*xj;
                    *xj=*xi;
                    *xi=temp;
            }
        }
}

/*****************************************************************

AverageWindowInit

*****************************************************************/ static void AverageWindowInit(struct sAverageFilter *af, int
numPoints)
{
        if(numPoints>MAX_AVERAGE_WINDOW)
            exit(-1)
        af->count=af->index=0;
        af->length=numPoints;
}

/*****************************************************************

AverageWindowUpdate

*****************************************************************/ static float AverageWindowUpdate(struct sAverageFilter*af, float
value)
{
int i;
float ave;

/*put value in filter
    */
    af->value[af->index]=value;
    af->index=(af->index+1)%af->length;
    if(af->count<af->length)
        ++af->count;
```

- 23 -

```
    /*average it
    */
    ave=0;
    for(i=0;i<af->count;i++)
         ave+=af->value[i];

return ave/af->count;
}
/*****************************************************************

FIRfilterInit

*****************************************************************/ static void FIRfilterInit(struct sFiltCoefHistory *fir)
{
int i;

for(i=0;i<fir->filt.num;i++)
              fir->history[i]=0.0;
}

/*****************************************************************

FIRfilterSamp

*****************************************************************/ static float FIRfilterSamp(float input, struct
SFiltCoefHistory*fir)
{
int i;
float *hist_ptr,*hist1_ptr,*coef_ptr;
float output hist_ptr=fir->history;
    hist1_ptr=hist_ptr;
    coef_ptr=fir->filt.coef+fir->filt.num-1;

output=*hist_ptr++*(*coef_ptr--);
    for(i=2;i<fir->filt.num;i++){
         *hist1_ptr++=*hist_ptr;
         output+=(*hist_ptr++)*(*coef_ptr--);
    }
    output+=input*(*coef_ptr);
    *hist1_ptr=input;

return output;
}
```

- 24 -

```
/*****************************************************************
FIRdecimate

*****************************************************************/ static void FIRdecimate(float *input, float *output, int N,
struct sFiltCoefHistory*fir, int decimateFactor)
{
int i,j;

for(i=0;i<N;i++)
        input[i]=FIRfilterSamp(input[i],fir);

for(i=0,j=0;i<N;i+=decimateFactor,j++)
        output[j]=input[i]

}
/*****************************************************************
GetADvalues

*****************************************************************/ static void GetADvalues(struct sJockAD *pJockAD,float *pAD)
{
int i;

for(i=0;i<BLOCK_SIZE;i++)
        pAD[i}=((float)pJockAD[i].ad-AD_OFFSET);
}
/*****************************************************************
Decimate

*****************************************************************/ static void Decimate(float *indata, float *outdata)
{
    FIRdecimate(indata, outdata, BLOCK_SIZE, &decFilter,
RESAMPLE_FACTOR);
}
/*****************************************************************
ComputePinHz

*****************************************************************/
```

- 25 -

```
static void ComputePinHz(struct sJockAD *pJockAD, float *pPinHz)
{
float xcenter, x1, x2, y1, y2, period;
float xleft1, xleft2, xright1, xright2, m, b;
int i,j, found;

for (i=0;i<NUM_FFT_PER_BLOCK;i++){ xcenter+(i * RESAMPLE_FACTOR * FFT_OFFSET)+(FFT_SIZE *
RESAMPLE_FACTOR/2)+PAD_SIZE;

xleft1=xleft2=xright1=xright2=0;

found=0;
        for(j=xcenter;j>0;j--)
            if(pJockAD[j]jock){
                found=1;
                break;

}
        if(found)
            xleft1=j;

else{
            pPinHz[i]=0;
            continue;
        } found=0;
        for(j=xcenter+1;j<BLOCK_SIZE+2*PAD_SIZE;J++)
            if(pJockAD[j].jock){
                found=1;
                break;
            } if(found)
            xright1=j;
        else{
            pPinHz[i]=0;
            continue;

} if(xcenter-xleft1<xright1-xcenter){
            found=0;
            for(j=xleft1-1;j>0;j--)
                if(pJockAD[j].jock){
                    found=1;
                    break
                }
```

- 26 -

```
              if(found)
                    xleft2=j;
              else{
                    pPinHz[i]=0;
                    continue;

}
              x1=(xleft1+xleft2)/2;
              x2=(xright1+xleft1)/2;
              y1=xleft1-xleft2;
              y2=xright1-xleft1;

}
        else{
              found=0;
              for(j=xright1+1;j<BLOCK_SIZE+2*PAD_SIZE;j++)
                    if(pJockAD[j].jock){
                           found=1;
                           break;

} if(found)
                    xright2=j;
              else{
                    pPinHz[i]=0;
                    continue;

}
              x1=(xright1+xleft1)/2;
              x2=(xright1+xright2)/2;

y1-xright1-xleft1;
              y2-xright2-xright1;

} m=(y2-y1)/(x2-x1);
        b=y2-m * x2;
        period+m * xcenter+b;

pPinHz[i]=((RAW_SAMP_FREQ/period)JOCK_REV_RATIO)*
JOCK_NUM_TEETH
        }
}
```

```
/****************************************************************
NotchFilter
****************************************************************/
static voidNotchFilter(float*x, float freq, int N)
{
const int sigma=8;
const int nHzStart=(int)MIN_PIN_FREQ;
const int NHzStop=(int)MAX_PIN_FREQ;
const int nNumVectors=nHzStop-nHzStart+1;
const float fMinNotch-0.01f;
const float fAmpNotch-100.f;
static int Nstore=0;
static struct sComplex *carNotch;
static float *fNotch[(int)(MAX_PIN_FREQ-MIN_PIN_FREQ+1)];
int Nfft=(n-1)*2;
int i,j;
float f,fMax, atten;

if(N!=Nstore){ if(Nstore!=0){
                free(carNotch);
                for(i=nHzStart;I<nHzStop;i++)
                    free(fNotch[i]);
        } if(N==0)
            return;

carNotch=(struct sComplex *)calloc(Nfft,
        sizeof(struct sComplex));Nstore=N;

for(i=0;i<nNumVectors;i++){ fNotch[i]=(float*)calloc(Nfft,sizeof(float));

for(j=0;j<Nfft;j++)
                fNotch[i][j]=fAmpNotch*(float)sin(M_2PI*(float)
(i+nHzStart) * SAMP_PERIOD * j);

windowGaussian(fNotch[i], Nfft, sigma);

for(j=0;j<Nfft;j++){
                carNotch[j].re=fNotch[i][j];
                carNotch[j].im=0;
```

```
                }
                fft(carNotch, Nfft);
                for(j-0;j<N;j++)
                    fNotch[i][j]=SQ(carNotch[j].re)+SQ
(carNotch[j].im);

fMax=fNotch[i][0]>fMinNotch/2?fNotch[i][0] :
fMinNotch/2;
                for(j=1;j<N;j++)
                    if(fNotch[i][j]>fMax)
                        fMax=fNotch[i][j];

attn=(float)pow(10, ATTEN_NOTCH_DB/(float)10)*
SQ(FFT_SIZE);
                for(j=0;j<N;j++){
                    f=fNotch[i][j];
                    f=-f;
                    f/=fMax;
                    f*=(float)1-((float)1/atten);
                    f+=1;
                    fNotch[i][j]=f;
                }
            }
        }
        if(freq>=nHzStart&&freq<=nHzStop)
            for(j=0;j<N;j++)
            x[j]*=fNotch[(int)freq-nHzStart][j];
}
/*****************************************************************
Detection
*****************************************************************/
static float Detection(float *data)
{
int n, bin;
float max;

bin=0;
    max=0;
    for(n=1; n<BINS_PER;n++)
        if(data[n]>max){
            max=data[n];
            bin=n;
        }
```

- 29 -

```
    return BIN2FREQ(bin);
}
/*****************************************************************
Power

*****************************************************************/ static float Power(float fTwang, float fChainspeed)
{
float fTension;
float fWatts;

fTension=(float)(4.0 * SQ(fChainLength_mm/MM2M)
* fChainLinearDensity * SQ(fTwang));
    Fwatts=fTension * fChainspeed;

return fWatts;
}
/*****************************************************************
ProcessPower

*****************************************************************/ voidProcessPower(struct sJockAD *pJockAD, struct sPowerSet
*psResults)
{
static struct sJockAD arCirc[bLOCK_SIZE * 2];
static float arAD1[BLOCK_SIZE];
static float arAD2[BLOCK_SIZE_RESAMPLE];
static float arAD3[FFT_SIZE];
static float arAD4[FFT_SIZE];
static float arPinHz[NUM_FFT_PER_BLOCK];
static struct sComplex cAD[FFT_SIZE];

float fPinHz, fPower, fTwang;
int i,j,k;

if(nBlockCount>0){
            memmove(arCirc,&arCirc[BLOCK_SIZE],sizeof(struct
sJockAD)*BLOCK_SIZE);
            memcpy(&arCirc[BLOCK_SIZE], pJockAD, sizeof(struct
sJockAD)*BLOCK_SIZE);
    }
    else{
            memset(arCirc,0,sizeof(struct
sJockAD)*BLOCK_SIZE);
```

- 30 -

```
                memcpy(&arCirc[BLOCK_SIZE], pJockAD, sizeof(struct
sJockAD) * BLOCK_SIZE);
}

GetADvalues(&arCirc[BLOCK_SIZE-PAD_SIZE], arAD1);
Decimate(arAD1, arAD2);
ComputePinHz(&arCirc[BLOCK_SIZE-2*PAD_SIZE], arPinHz);

for(i=0, k=0; k<NUM_FFT_PER_BLOCK; i+=FFT_OFFSET, k++){

MEMCPY(arAD3, &arAD2[i], FFT_SIZE*sizeof(float));

windowGaussian(arAD3, FFT_SIZE, WINDOW_LOBE_WIDTH);

for(j=0; j<FFT_SIZE;j++){
            cAD[j].re=arAD3[j];
            cAD[j].im=0.0;
        } fft(cAD, FFT_SIZE);

for (j=0; j<BINS_PER; j++)
            arAD4[j]=SQ(cAD[j].re)+SQ(cAD[j].im);

fPinHz=arPinHz[k];
        NotchFilter(arAD4, fPinHz,BINS_PER);
        fTwang=Detection(arAD4);
        fPower=Power(fTwang, PINHZ2SPEED(fPinHz));

psResults->array.fTwang[k]=fTwang;
        psResults->array.fPinHz[k]=fPinHz;
        psResults->array.fPower[k]=fPower;

psResults->ave.nTwang[0]=(int)AverageWindowUpdate
(&AveTwang[0],fTwang);
        psResults->ave.nTwang[1]=(int)AverageWindowUpdate
(&AveTwang[1],fTwang);
        psResults->ave.nTwang[2]=(int)AverageWindowUpdate
(&AveTwang[2],fTwang);
        psResults->ave.nPinHz[0]=(int)AverageWindowUpdate
(&AvePinHz[0],fPinHz);
        psResults->ave.nPinHz[1]=(int)AverageWindowUpdate
(&AvePinHz[1],fPinHz);
        psResults->ave.nPinHz[2]=(int)AverageWindowUpdate
(&AvePinHz[2],fPinHz);
        psResults->ave.nPower[0]=(int)AverageWindowUpdate
(&AvePower[0],fPower);
        psResults->ave.nPower[1]=(int)AverageWindowUpdate
```

- 31 -

```
        (&AvePower[1],fPower);
            psResults->ave.nPower[2]=(int)AverageWindowUpdate
(&AvePower[2],fPower);

++nFftCount;
        }
    ++nBlockCount;
}
/*****************************************************************

ProcessPowerInit

*****************************************************************/ voidProcessPowerInit(void)
{
            nFftCount-nBlockCount=0;
            decFilter.filt=FilterLP4000;
            FIRfilterInit(&decFilter);

AverageWindowInit(&AveTwang[0],NUM_FFT_PER_1_AVE);
            AverageWindowInit(&AveTwang[1],NUM_FFT_PER_2_AVE);
            AverageWindowInit(&AveTwang[2],NUM_FFT_PER_3_AVE);

AverageWindowInit(&AvePinHz[0],NUM_FFT_PER_1_AVE);
            AverageWindowInit(&AvePinHz[1],NUM_FFT_PER_2_AVE);
            AverageWindowInit(&AvePinHz[2],NUM_FFT_PER_3_AVE);

AverageWindowInit(&AvePower[0],NUM_FFT_PER_1_AVE);
            AverageWindowInit(&AvePower[1],NUM_FFT_PER_2_AVE);
            AverageWindowInit(&AvePower[2],NUM_FFT_PER_3_AVE);
}
```

We claim:

1. An apparatus for measuring the power transmitted by an elongate flexible member, comprising:
   a system having a first engagement means separated from a second engagement means, the elongate flexible member coupling the first engagement means with the second engagement means so that when the first engagement means is rotated by a power source the elongate flexible member moves in the direction of the rotation of the first engagement means, which in turn causes the moving elongate flexible member to rotate the second engagement means;
   a tension sensor spaced away from the elongate flexible member in order to measure the vibration of the elongate flexible member;
   a speed sensor that measures the speed of the elongate flexible member; and
   a computer that receives the tension measurement and the speed measurement and determines the power transmitted by the elongate flexible member.

2. The apparatus of claim 1 wherein the tension sensor filters extraneous signals.

3. The apparatus of claim 1 wherein the computer filters extraneous signals.

4. The apparatus of claim 1 wherein the computer has a digital display for indicating the power output of the elongate flexible member.

5. The apparatus of claim 1 wherein the computer generates a signal representing the power output of the elongate flexible member to a terminal that displays the power output.

6. The apparatus of claim 1 wherein the system is a bicycle.

7. The apparatus of claim 1 wherein the elongate flexible member is a chain.

8. The apparatus of claim 1 wherein the elongate flexible member is a rubber belt having a plurality of metal elements equally spaced within and throughout the belt.

9. The apparatus of claim 1 wherein the first and second engagement means each comprise various sized sprockets that the elongate flexible member moves from one sprocket to another sprocket on each engagement means.

10. A method for measuring the power transmitted by an elongate flexible member in a system having a first engagement means separated from a second engagement means, the elongate flexible member coupling the first engagement means with the second engagement means so that when the first engagement means is rotated by a power source the elongate flexible member moves in the direction of the rotation of the first engagement means, which in turn causes the moving elongate flexible member to rotate the second engagement means; the method comprising the steps of:
   measuring the vibration of the elongate flexible member with a tension sensor spaced away from the elongate flexible member;
   determining the speed of the elongate flexible member by a speed sensor; and
   receiving the tension measurement and the speed measurement in a computer,
   generating a signal representing the power transmitted by the elongate flexible member.

11. The method of claim 10 wherein extraneous signals are filtered by the tension sensor.

12. The method of claim 10 wherein extraneous signals are filtered by the computer.

13. The method of claim 10 wherein the power output of the elongate flexible member is displayed by a digital display of the computer.

14. The method of claim 10 wherein the signal representing the power output of the elongate flexible member is provided by the computer to a terminal that displays the power output.

15. The method of claim 10 wherein the system is a bicycle.

16. The method of claim 10 wherein the elongate flexible member is a chain.

17. The method of claim 10 wherein the elongate flexible member is a rubber belt having a plurality of metal material equally spaced within and throughout the belt.

18. The method of claim 10 wherein the first and second engagement means each comprise various sized sprockets that the elongate flexible member moves from one sprocket to another sprocket on each engagement means.

19. A method for determining the tension in a chain on a vehicle such as a bicycle driven by the chain comprising the steps of:
   a) identifying a vibrating section of the drive chain;
   b) providing a vibration sensor on the bicycle in proximity and spaced away from the elongate flexible member to the vibrating section of the drive chain;
   c) measuring the frequency of vibration of the vibrating section of the drive chain by means of the sensor during operation of the bicycle; and
   d) utilizing the frequency of vibration to determine the tension in the drive chain.

20. A method according to claim 19, wherein said step of determining the tension in the drive chain is performed by a computer on the bicycle.

21. A method according to claim 19, further including eliminating spurious information due to noise sources.

22. A method according to claim 19, further including eliminating spurious information due to links of the chain and teeth of sprockets engaging the chain.

23. A method for determining the vibrational frequency of a chain on a vehicle such as a bicycle driven by the chain comprising:
   a) providing a chain vibration signal by means of a vibration sensor in proximity to and spaced away from the drive chain;
   b) performing a Fast Fourier Transform on the chain vibration signal; and
   c) heuristically selecting the chain vibration frequency.

24. A method according to claim 23, wherein said steps of performing a Fast Fourier Transform and selecting the chain vibration frequency are performed by a computer on the bicycle.

25. Apparatus for measuring the tension in a chain on a vehicle such as a bicycle driven by the chain comprising:
   a) a vibration sensor mounted on the bicycle in proximity to and spaced away from a vibrating section of the chain for measuring the frequency of vibration of the vibrating section of the chain during operation of the vehicle;
   b) signal processing means on the vehicle operatively connected to the vibration sensor for selecting a measured frequency of vibration; and
   c) computer means on the vehicle operatively connected to the signal processing means for computing the tension in the chain.

26. Apparatus according to claim 25, wherein the signal processing means includes means for eliminating spurious information signals due to noise.

27. A method for measuring the power output of a person operating a vehicle such as a bicycle driven by means including a chain comprising the steps of:

a) measuring the vibration of the chain by means of a sensor on the vehicle that is spaced away from the chain;
b) measuring the speed of the chain by means of a sensor on the vehicle;
c) computing the power transmitted by the chain by means of a computer on the vehicle using the chain speed and vibration.

28. A method according to claim 27, further including displaying the computed power by means of a display associated with the computer.

29. A method according to claim 27, further including eliminating spurious information due to noise sources by means of signal processing means associated with said computer.

30. A method according to claim 29, wherein said step of eliminating spurious information comprises signal processing employing Fast Fourier Transforms.

31. Apparatus for measuring the power output of a person operating a vehicle such as a bicycle driven by means including a chain comprising:

a) a tension sensor mounted on the vehicle in proximity to and spaced away from a vibrating section of the chain for measuring the vibration of the chain;
b) a speed sensor mounted on the vehicle in proximity to the chain for measuring the speed of the chain; and
c) a computer on the vehicle and operatively connected to the tension sensor and to the speed sensor for computing the power transmitted by the chain using the measured vibration and speed of the chain.

32. Apparatus according to claim 31, further including a display associated with the computer for providing a visual display of the computed power.

33. Apparatus according to claim 31, further including signal processing means operatively associated with the computer for eliminating spurious information due to noise sources.

* * * * *